(12) United States Patent
Ishii et al.

(10) Patent No.: US 8,995,808 B2
(45) Date of Patent: Mar. 31, 2015

(54) OPTICAL COMPONENT HAVING DIFFERENT WAVEGUIDE ANGLES AT THE INTERFACE BETWEEN TWO PLANAR LIGHTWAVE CIRCUITS

(75) Inventors: Motohaya Ishii, Atsugi (JP); Takashi Saida, Atsugi (JP); Hiroshi Terui, Yokohama (JP); Tomoyo Shibazaki, Yokohama (JP); Yuichi Kikuchi, Yokohama (JP)

(73) Assignees: Nippon Telegraph and Telephone Corporation, Tokyo (JP); NTT Electronics Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 14/110,775

(22) PCT Filed: Apr. 18, 2012

(86) PCT No.: PCT/JP2012/002701
§ 371 (c)(1),
(2), (4) Date: Oct. 9, 2013

(87) PCT Pub. No.: WO2012/144209
PCT Pub. Date: Oct. 26, 2012

(65) Prior Publication Data
US 2014/0023333 A1    Jan. 23, 2014

(30) Foreign Application Priority Data
Apr. 19, 2011   (JP) .................................. 2011-093496

(51) Int. Cl.
*G02B 6/26*   (2006.01)
*G02B 6/12*   (2006.01)
(Continued)

(52) U.S. Cl.
CPC   *G02B 6/12* (2013.01); *G02B 6/327* (2013.01); *G02B 6/122* (2013.01); *G02B 2006/12038* (2013.01); *G02B 2006/1204* (2013.01)

USPC .............................................. 385/50; 385/31

(58) Field of Classification Search
CPC ........................................................ G02B 6/327
USPC ....................................................... 385/31, 50
See application file for complete search history.

(56) References Cited

U.S. PATENT DOCUMENTS 4,790,615 A * 12/1988 Seki et al. ..................... 385/129
5,760,901 A *  6/1998 Hill ............................... 356/450
(Continued)

FOREIGN PATENT DOCUMENTS

EP    1096278    5/2001
JP    2002357732    12/2002
(Continued)

OTHER PUBLICATIONS

International Preliminary Report on Patentability and Written Opinion dated Oct. 31, 2013 in corresponding PCT Application No. PCT/JP2012/002701.
(Continued)

*Primary Examiner* — Charlie Y Peng
(74) *Attorney, Agent, or Firm* — Workman Nydegger

(57) ABSTRACT

An optical component has first and second planar lightwave circuits. The first and second planar lightwave circuits are aligned and jointed such that the position of an i-th optical waveguide (where i is an integer greater than or equal to 1 and less than or equal to n) of the first planar lightwave circuit and that of an i-th optical waveguide of the second planar lightwave circuit are matched on a joint interface. An angle formed by the i-th optical waveguide of the first planar lightwave circuit and a normal of the interface is configured to vary in accordance with a value of i within a range satisfying the Snell's law.

7 Claims, 7 Drawing Sheets

(51) Int. Cl.
*G02B 6/32* (2006.01)
*G02B 6/122* (2006.01)

(56) References Cited

U.S. PATENT DOCUMENTS

| | | | |
|---|---|---|---|
| 6,560,000 B2 * | 5/2003 | Iyer et al. | 359/238 |
| 6,571,037 B1 * | 5/2003 | Rogers et al. | 385/37 |
| 7,116,879 B2 * | 10/2006 | Arakida | 385/129 |
| 7,574,089 B1 * | 8/2009 | Zribi et al. | 385/129 |
| 8,238,697 B2 * | 8/2012 | Little et al. | 385/5 |
| 2002/0034352 A1 * | 3/2002 | Williams et al. | 385/16 |
| 2012/0251046 A1 * | 10/2012 | Kawashima et al. | 385/37 |

FOREIGN PATENT DOCUMENTS

| | | |
|---|---|---|
| JP | 2003-207664 | 7/2003 |
| JP | 2009222753 | 10/2009 |

OTHER PUBLICATIONS

International Search Report dated May 29, 2012 in PCT Application No. PCT/JP2012/002701.

Extended European Search Report in corresponding European Patent Application No. 12774664.2 received Nov. 24, 2014.

* cited by examiner

OPTICAL COMPONENT HAVING DIFFERENT WAVEGUIDE ANGLES AT THE INTERFACE BETWEEN TWO PLANAR LIGHTWAVE CIRCUITS

TECHNICAL FIELD

The present invention relates to an optical component, and in more detail, relates to an optical component in which a first planar lightwave circuit and a second planar lightwave circuit, having different refractive indices, are butt jointed on the end surfaces thereof such that groups of multiple optical waveguides respectively formed on the planar lightwave circuits are optically coupled to each other.

BACKGROUND ART

With the sophistication of optical communication systems, demand has been increased for highly functional optical modules (optical components). A planar lightwave circuit can be implemented in the form of various lightwave circuits by forming optical waveguides on the substrate thereof, and is being used as a component composing an optical module. For the higher functionalization of optical modules, hybrid optical modules are being implemented by integrating planar lightwave circuits having different functions or by integrating a spatial optical component, such as a lens and a spatial phase modulator, and a planar lightwave circuit. Specific examples of optical modules include, for instance, an RZ-DQPSK (Return to Zero Differential Quadrature Phase Shift Keying) module obtained by optically coupling planar lightwave circuits made of different materials such as silica-based glass and lithium niobate (LN).

As an example, an optical module will be assumed that a first planar lightwave circuit made of silica-based glass and a second planar lightwave circuit made of LN are butt jointed. FIG. 1 shows a conventional example of PTL 1. Chances are that reflection is caused on an interface 3 between a first planar lightwave circuit 1 and a second planar lightwave circuit 2. To prevent this, (1) first, an angle θ is determined such that Fresnel reflection R is not coupled, as a return light, to an optical waveguide 4 of the first planar lightwave circuit 1. In general, the angle θ is an angle of 4 to 12 degrees. Here, the Fresnel equation is expressed by the following equation. $n_1$ and $n_a$ are respectively refractive indices of silica-based glass and LN. It should be noted that, where an adhesive is applied between the first planar lightwave circuit and the second planar lightwave circuit, $n_a$ is set as the refractive index of the adhesive.

$$R = \left(\frac{n_1 - n_a}{n_1 + n_a}\right)^2 \quad \text{[Math. 1]}$$

(2) Next, an angle φ of an optical waveguide 5 of the second planar lightwave circuit 2 is determined such that the Snell's law expressed by the following equation is satisfied. $n_2$ is the refractive index of LN.

$$\frac{\sin\theta}{\sin\varphi} = \frac{n_2}{n_1} \quad \text{[Math. 2]}$$

In FIG. 1, the joint interface 3 is slanted by an angle $\alpha_1$ with respect to a sidewall 6 of the planar lightwave circuit. However, when the optical waveguide is slanted in the vicinity of the interface, the angle formed by the joint interface 3 and the sidewall 6 of the planar lightwave circuit can be set to the right angle while reflection can be prevented. When planar lightwave circuits are butt jointed on the end surfaces thereof perpendicular to the lateral surfaces thereof, the planar lightwave circuits can be formed in rectangular shapes with four right-angled corners and can be easily processed. FIG. 2 shows such an example. An optical fiber 3, the first planar lightwave circuit 1 and the second planar lightwave circuit 2 are butt jointed, while being aligned on an alignment member 4. In this example, the first planar lightwave circuit 1 and the second planar lightwave circuit 2 are respectively formed in oblong shapes. Although reference signs are different from those in FIG. 1, the angle formed by the optical waveguide of the first planar lightwave circuit 1 and a normal of the interface is set as $\phi_1$, whereas the angle formed by the optical waveguide of the second planar lightwave circuit 2 and a normal of the interface is set as $\theta_1$. In this case, the Snell's law is expressed as the following equation.

$$\frac{\sin\phi_1}{\sin\theta_1} = \frac{n_2}{n_1} \quad \text{[Math. 3]}$$

Based on the aforementioned conditions, $\phi_1$ and $\theta_1$ are generally set to 6 degrees and 4 degrees, respectively in the butt joint between the first planar lightwave circuit made of silica-based glass and the second planar lightwave circuit made of LN.

CITATION LIST

Patent Literature

PTL 1: Japanese Patent Laid-open No. 2003-207664

SUMMARY OF INVENTION

Technical Problem

However, in the configuration of FIG. 2, a waveguide interval is deviated from a designed value to a greater extent when the angles formed by the interface and the multiple optical waveguides are misaligned in coupling the groups of multiple optical waveguides to each other. This causes joint loss. Further, in jointing planar lightwave circuits with different thermal expansion coefficients to each other, a drawback is produced that an optical characteristic, especially, joint loss varies to a greater extent due to temperature change in usage environment. With reference to FIG. 3, explanation will be made for a drawback of oblique waveguides formed obliquely with respect to an end surface. A waveguide interval deviation ΔL can be calculated by the following equation when an angular deviation θ is produced in processing (e.g., gliding) of an end surface where oblique waveguides are formed at an angle ψ with respect to the end surface.

$$\Delta L = L - L_0 = L_0\left(\frac{\sqrt{\tan^2\theta + 1}}{1 - \tan\varphi\tan\theta} - 1\right) \quad \text{[Math. 4]}$$

Here, L is a waveguide interval where the angular deviation θ is produced, whereas $L_0$ is a waveguide interval where no angular deviation is produced, i.e., a designed value.

For example, where the waveguide interval $L_0$ is 2500 μm, the waveguide interval is deviated by 0.9 μm or greater when the end surface angle of the oblique waveguide, set to 6 degrees, is deviated by 0.2 degrees (see FIG. 4). When the waveguide interval is deviated by 0.9 μm or greater, the joint loss is increased by 0.2 dB or greater. Further, when environmental temperature is changed by 50 degrees, the joint loss is increased by 0.5 dB or greater. Increase in joint loss becomes remarkable in proportion to increase in the waveguide interval. In other words, when deviation is caused in the angle of the end surface on which multiple optical waveguides are aligned, a drawback is produced that is not caused in coupling one single optical waveguide to another single optical waveguide to each other and that the interval deviation in optical waveguides located on an end side becomes greater than that in optical waveguides located in the vicinity of the center.

The present invention has been produced in view of such drawback, and it is an object of the present invention to provide an optical component that is stable against temperature change in usage environment and that is configured by butt-jointing a first planar lightwave circuit and a second planar lightwave circuit, having different refractive indices, on the end surfaces thereof such that groups of multiple optical waveguides respectively formed on the planar lightwave circuits are optically coupled to each other.

Solution to Problem

To achieve the object as described above, a first aspect of the present invention relates to an optical component in that a first planar lightwave circuit having a first refractive index and a second planar lightwave circuit having a second refractive index different from the first refractive index are butt jointed, and is characterized in that: each of the first and second planar lightwave circuits includes first to n-th optical waveguides (where n is an integer greater than or equal to 2); a position of an i-th optical waveguide (where i is an integer greater than or equal to 1 and less than or equal to n) of the first planar lightwave circuit and a position of an i-th optical waveguide of the second planar lightwave circuit are matched on a joint interface between the first planar lightwave circuit and the second planar lightwave circuit; and an angle formed by the i-th optical waveguide of the first or second planar lightwave circuit together with a normal of the joint interface varies in accordance with a value of i within a range satisfying the Snell's law, while the angle is set to be larger when the i-th optical waveguide is positioned closer to a vicinity of a middle between a first optical waveguide and an n-th optical waveguide on the joint interface, whereas the angle is set to be smaller when the i-th optical waveguide is positioned away from the vicinity of the middle.

Further, a second aspect relates to the first aspect, and is characterized in that, where the middle between the first optical waveguide and the n-th optical waveguide is set as a center, a direction of the angle formed by the i-th optical waveguide is set such that a distance between the i-th optical waveguide and the center is reduced.

Further, a third aspect relates to the first or second aspect, and is characterized in that the first planar lightwave circuit and the second planar lightwave circuit having the second refractive index different from the first refractive index are butt jointed on an end surface of the first planar lightwave circuit perpendicular to a lateral surface thereof and an end surface of the second planar lightwave circuit perpendicular to a lateral surface thereof.

Further, a fourth aspect of the present invention relates to any of the first to third aspects, and is characterized in that the first planar lightwave circuit is made of silica-based glass and the second planar lightwave circuit is made of LN.

Advantageous Effects of Invention

According to the present invention, it is possible to provide such an optical component that is stable against temperature change in usage environment and that a first planar lightwave circuit and a second planar lightwave circuit, having different refraction indices, are butt jointed on the end surfaces thereof such that groups of multiple optical waveguides respectively formed on the planar lightwave circuits are optically coupled to each other, with the configurations that: the multiple optical waveguides are formed on each of the first planar lightwave circuit and the second planar lightwave circuit; angles formed by the respective optical waveguides on the first or second planer lightwave circuit together with a normal of a joint interface are set to be different from each other within a range satisfying the Snell's law, while such angle is set to be larger when a given optical waveguide is positioned closer to the vicinity of the middle between a first optical waveguide and an n-th optical waveguide on the joint interface, whereas such angle is set to be smaller when the given optical waveguide is positioned away from the vicinity of the middle.

DESCRIPTION OF EMBODIMENTS

An embodiment of the present invention will be hereinafter explained with respect to the drawings.

Figure 1:
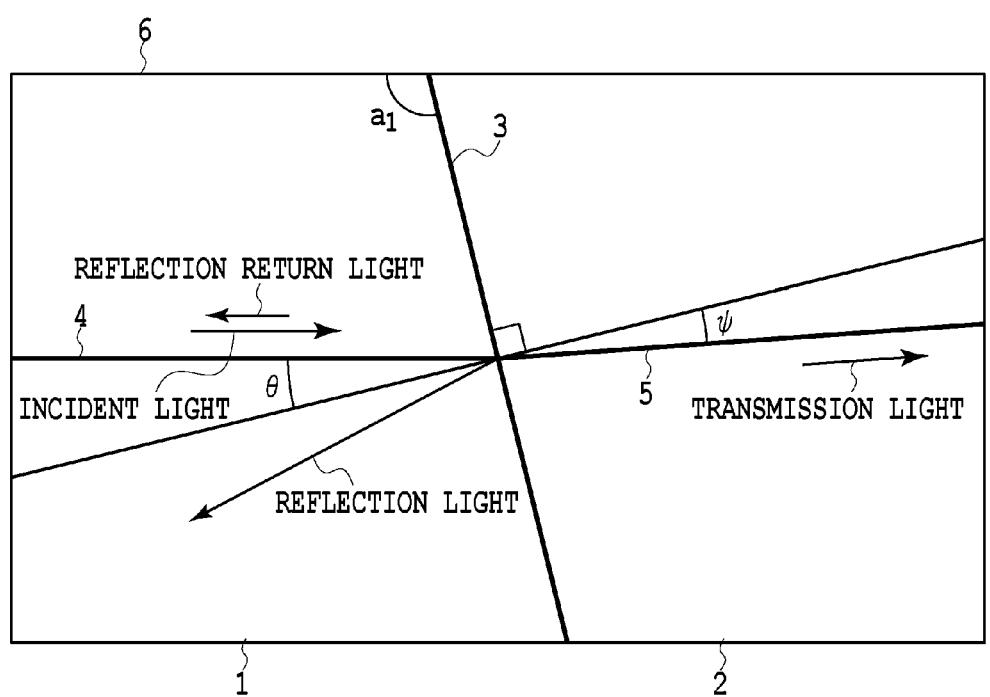
FIG. 1 is a diagram of a conventional example that a first planar lightwave circuit made of silica-based glass and a second planar lightwave circuit made of LN are butt jointed.
Figure 2:
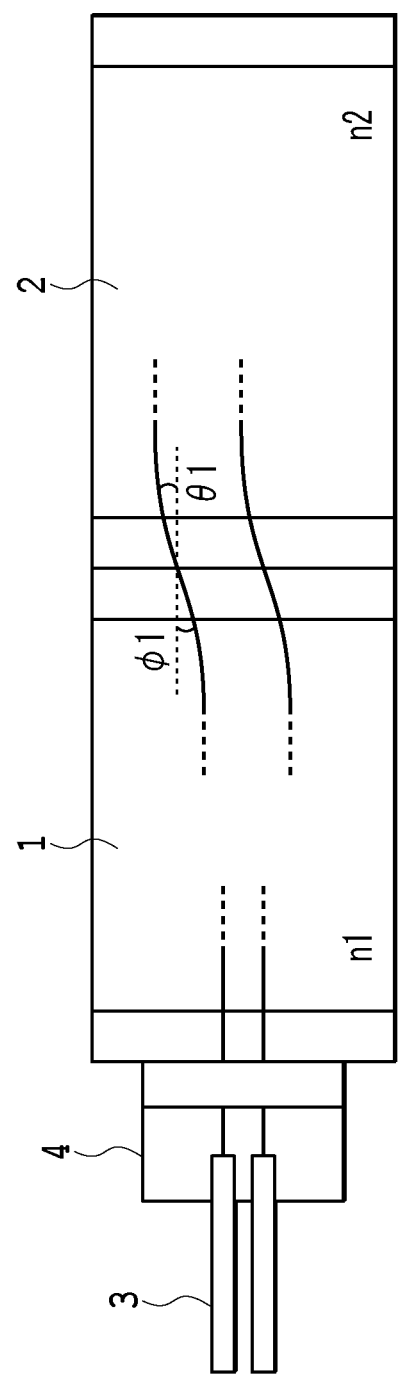
FIG. 2 is a diagram showing a configuration for preventing reflection on a right-angled interface.
Figure 3:
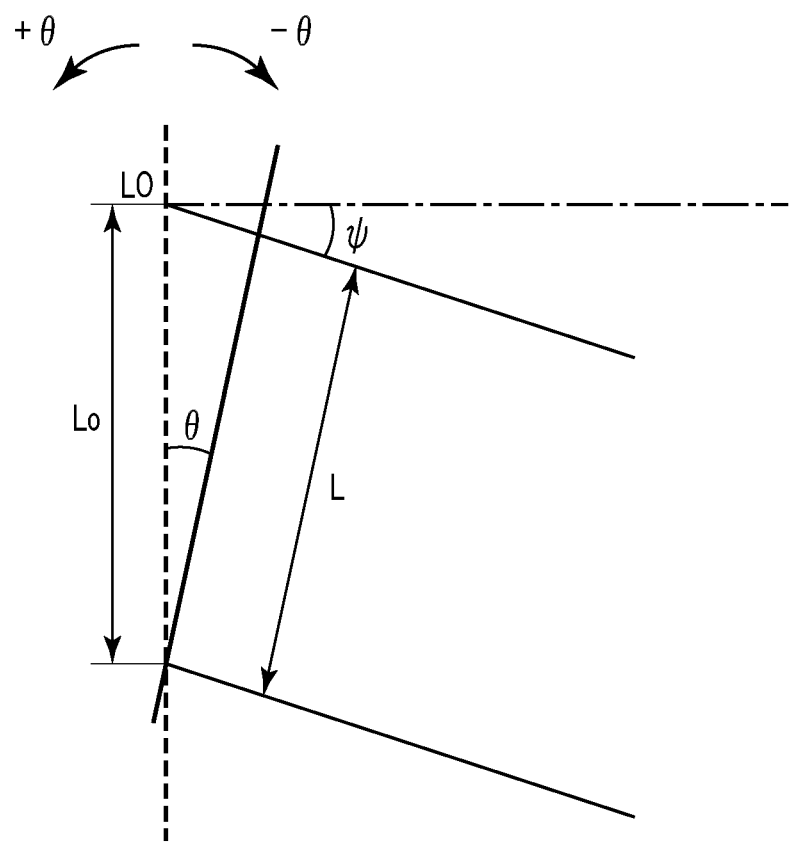
FIG. 3 is a diagram for explaining a drawback of oblique waveguides formed obliquely with respect to an end surface.
Figure 4:
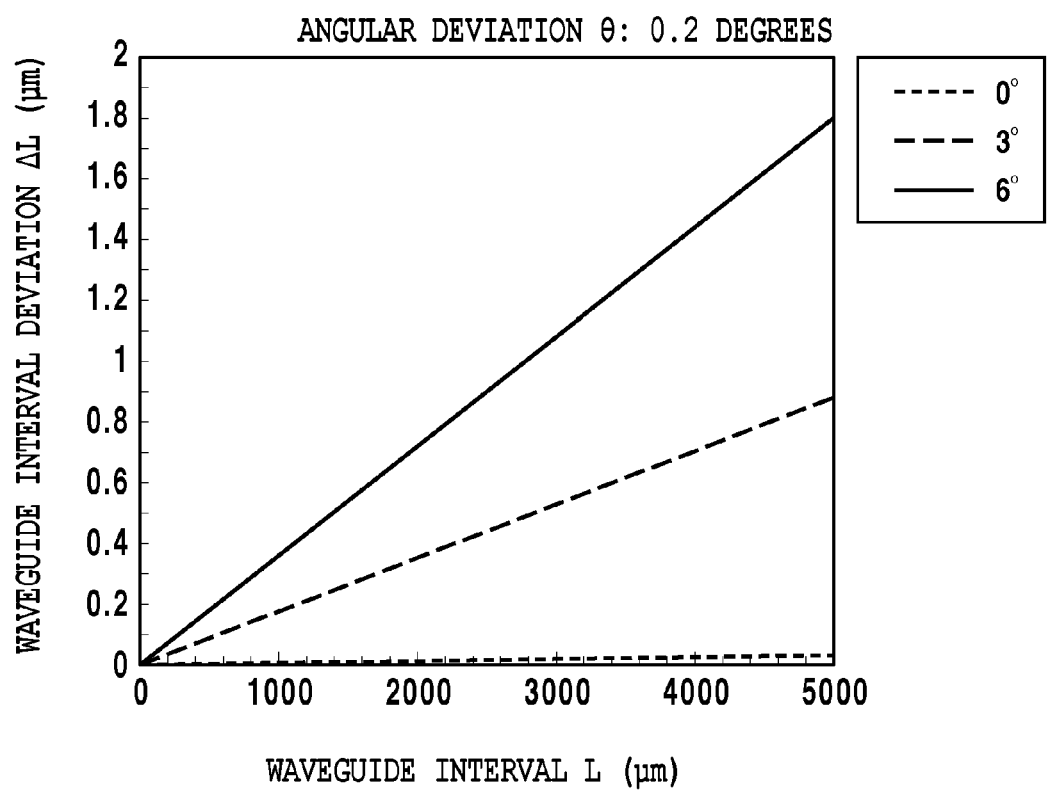
FIG. 4 is a chart showing a relation between waveguide interval and waveguide interval deviation in oblique waveguides.
Figure 5:
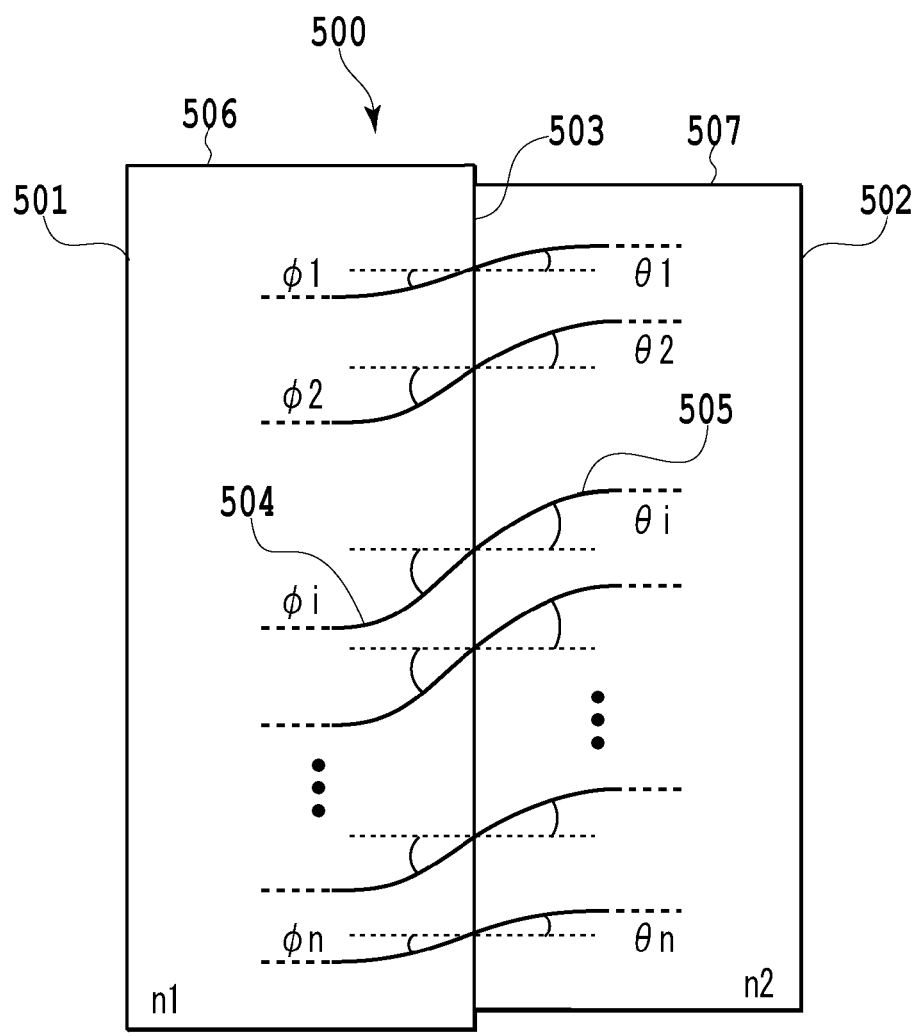
FIG. 5 is a diagram showing an optical component according to a first embodiment of the present invention.

FIG. 5 shows an optical component according to a first embodiment of the present invention. An optical component 500 is configured by butt-jointing a first planar lightwave circuit 501 having a first refraction index $n_1$ and a second planar lightwave circuit 502 having a second refraction index $n_2$ different from the first refraction index $n_1$. A joint end surface 503 of the first planar lightwave circuit 501 and that of the second planar lightwave circuit 502 are perpendicular to a lateral surface 506 of the first planar lightwave circuit and a lateral surface 507 of the second planar lightwave circuit. First to n-th optical waveguides (where n is an integer greater than or equal to 2) are formed on the first planar lightwave circuit 501. Likewise, the first to n-th optical waveguides are also formed on the second planar lightwave circuit 502.

In the optical component 500 according to the present invention, the first planar lightwave circuit 501 and the second planar lightwave circuit 502 are aligned and jointed such that the position of an i-th optical waveguide 504 (where i is an integer greater than or equal to 1 and less than or equal to n) of the first planar lightwave circuit 501 and that of an i-th optical waveguide 505 of the second planar lightwave circuit 502 are matched on the joint interface. At this time, to prevent reflection on the interface, the multiple optical waveguides on each planar lightwave circuit are respectively formed while being slanted in the vicinity of the interface; and an angle $\phi_i$ formed by the i-th optical waveguide of the first planar lightwave circuit 501 together with a normal of the interface is set to be larger as a given optical waveguide is positioned closer to the vicinity of the middle between the first optical waveguide and the n-th optical waveguide, whereas the angle $\phi_i$ is set to be smaller as the given optical waveguide is positioned away from the vicinity of the middle. Further, an angle formed by a given optical waveguide of the first/second planar lightwave circuit 501/502 together with a normal of the joint interface is set to be in a range to satisfy the Snell's law. In other words, an angle formed by a given optical waveguide and a normal of the joint interface is set to be larger as the given optical waveguide is positioned closer to the vicinity of the middle on the joint interface, whereas the angle is set to be smaller as the given optical waveguide is positioned closer to an end on the joint interface. With the application of such configuration, it is possible to reduce an interval deviation in optical waveguides positioned away from the vicinity of the middle between the first optical waveguide and the n-th optical waveguide. Further, when the angles of the optical waveguides positioned on the both ends are set enough to satisfy a target value of the reflection attenuation amount, the reflection attenuation amount in a given optical waveguide disposed inside the end-side optical waveguides will have a better value sufficiently greater than the target value. It should be noted that an angle $\theta_i$ formed by the i-th optical waveguide of the second planar lightwave circuit 502 together with the interface is selected to satisfy the Snell's law, and accordingly, varies depending on the value of i.

Figure 6:
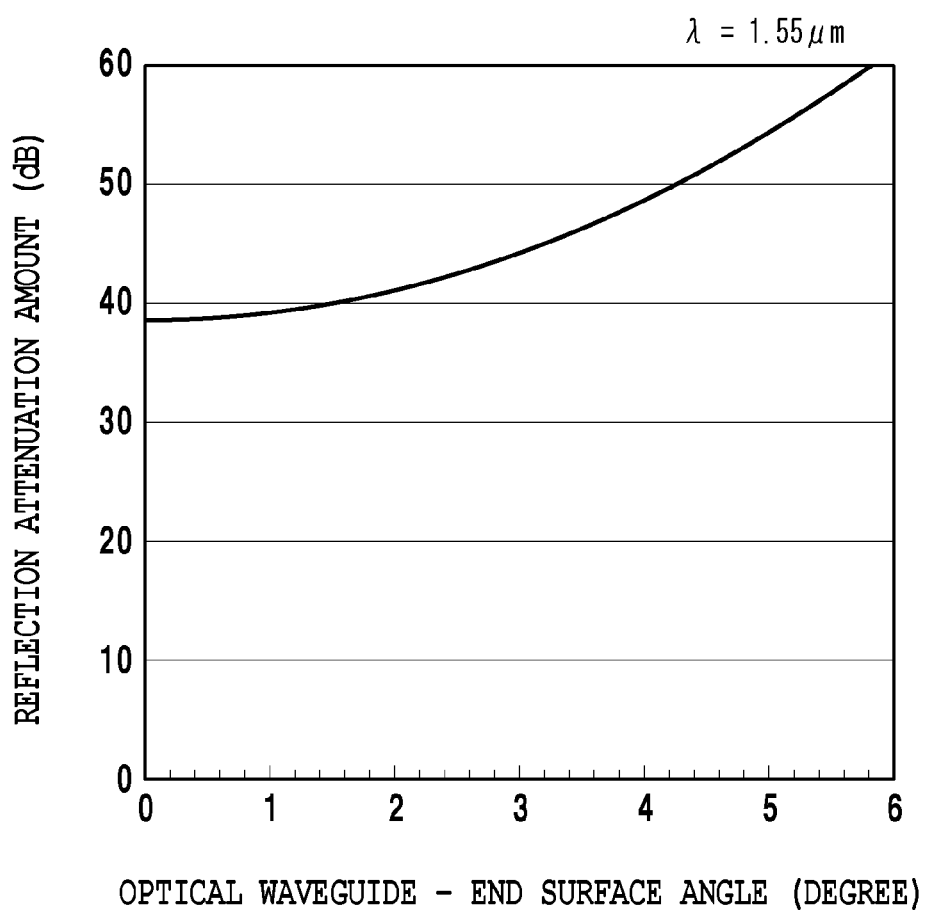
FIG. 6 is a chart showing a reflection attenuation amount where the first planar lightwave circuit is formed by a PLC made of silica-based glass and the second planar lightwave circuit is made of LN in the optical component according to the present invention.

FIG. 6 shows an example of the reflection attenuation amount where the first planar lightwave circuit is formed by a PLC made of silica-based glass and the second planar lightwave circuit is made of LN in the optical component 500 according to the present invention. In general, a non-reflective coat film is formed on an LN end surface for reducing Fresnel reflection loss, and reflection is thereby reduced. Now, the reflection attenuation amount of the PLC as the first planar lightwave circuit will be described. In this example, the reflection attenuation amount is 45 dB where an angle formed between a given optical waveguide and an end surface of the PLC is set to 3 degrees. Therefore, when the angles of the optical waveguides disposed on the both ends are set to 3 degrees and the angles of optical waveguides disposed inside the end-side optical waveguides are set to be gradually greater than 3 degrees, the reflection attenuation amount of each optical waveguide can be accordingly set to 45 dB or greater.

Figure 7:
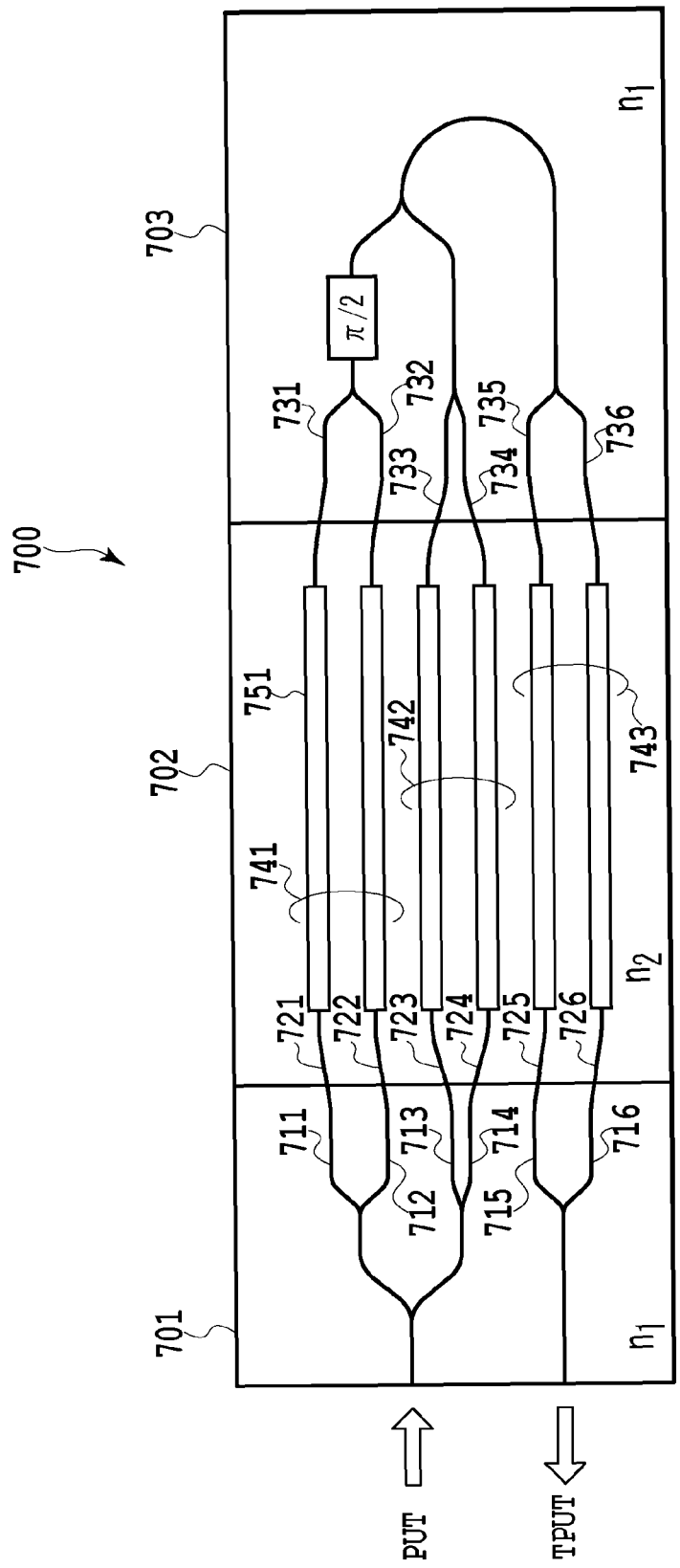
FIG. 7 is a diagram showing an optical component according to a second embodiment of the present invention.

FIG. 7 shows an optical component according to a second embodiment of the present invention. In an optical component 700, a first planar lightwave circuit 701 having the first refraction index $n_1$, a second planar lightwave circuit 702 having the second refraction index $n_2$ different from the first refraction index $n_1$ and a third planar lightwave circuit 703 having the first refraction index $n_1$ are butt jointed. Each of the first planar lightwave circuit 701 and the third planar lightwave circuit 703 is formed by silica-based optical waveguides on a silicon substrate, and is configured to include six oblique optical waveguides 711 to 716, 731 to 736 and Y-branch waveguides on an interface that is jointed to the second planar lightwave circuit 702. The second planar lightwave circuit 702 is formed by optical waveguides on an LN substrate, and six oblique optical waveguides 721 to 726 are formed thereon. Electrodes 751 are formed on the respective optical waveguides at intervals of 500 μm, and function as phase modulators. The intervals of the electrodes are restricted by electrical crosstalk among the electrodes. Hence, it is difficult to extremely reduce the intervals. In this configuration, the optical component functions as an RZ-DQPSK module by driving electrode pairs 741 and 742 as the ones for PSK modulation and by driving an electrode pair 743 as the one for RZ modulation.

The angles formed by the optical waveguides 711, 712, 715, 716, 731, 732, 735 and 736 with the relevant end surfaces are set to 3 degrees; the angles formed by the optical waveguides 713, 714, 733 and 734 together with the relevant end surfaces are set to 6 degrees; and the angles formed by the optical waveguides 721 to 726 of the second planar lightwave circuit, which are respectively coupled to the aforementioned optical waveguides, together with the relevant end surfaces are set to values satisfying the Snell's law. Further, the respective optical waveguides are bent in a direction that the waveguide intervals among the optical waveguides 711 to 716, 721 to 726, 731 to 736 are reduced on the joint interface between the second planar lightwave circuit 702 and either the first planar lightwave circuit 701 or the third planar lightwave circuit 703. In other words, the waveguide intervals are reduced on the joint interface by setting the middle between the optical waveguide 721 and the optical waveguide 726 as a center and by setting the direction of the angle formed by each optical waveguide such that the distance between each optical waveguide and the center is reduced on the joint interface.

With such configuration, the waveguide interval deviation becomes 0.4 μm or less even when the angular deviation on the end surface becomes 0.2 degrees while the reflection attenuation amount is set to 40 dB or greater, and thereby, loss variation can be suppressed to 0.2 dB or less even when environmental temperature varies by 50 degrees.

REFERENCE SIGNS LIST

500 Optical component
501 First planar lightwave circuit
502 Second planar lightwave circuit

The invention claimed is:

1. An optical component in that a first planar lightwave circuit having a first refractive index and a second planar lightwave circuit having a second refractive index different from the first refractive index are butt jointed, wherein:
   each of the first and second planar lightwave circuits includes first to n-th optical waveguides (where n is an integer greater than 2),
   a position of an i-th optical waveguide (where i is an integer greater than or equal to 1 and less than or equal to n) of the first planar lightwave circuit and a position of an i-th optical waveguide of the second planar lightwave circuit are matched on a joint interface between the first planar lightwave circuit and the second planar lightwave circuit, and
   an angle formed by the i-th optical waveguide of the first or second planar lightwave circuit together with a normal of the joint interface varies in accordance with a value of i within a range satisfying the Snell's law, the angle being set to be larger when the i-th optical waveguide is positioned closer to a vicinity of a middle between a first optical waveguide and an n-th optical waveguide on the joint interface, the angle being set to be smaller when the i-th optical waveguide is positioned away from the vicinity of the middle.

2. The optical component recited in claim 1, wherein on the joint interface the middle between the first optical waveguide and the n-th optical waveguide is set as a center, a direction of the angle formed by the i-th optical waveguide is set such that a distance between the i-th optical waveguide and the center is reduced.

3. The optical component recited in claim 1, wherein the First planar lightwave circuit and the second planar lightwave circuit having the second refractive index different from the first refractive index are butt jointed on an end surface of the first planar lightwave circuit perpendicular to a lateral surface thereof and an end surface of the second planar lightwave circuit perpendicular to a lateral surface thereof.

4. The optical component recited in claim 1, wherein the first planar lightwave circuit is made of silica-based glass and the second planar lightwave circuit is made of LN.

5. The optical component recited in claim 2, wherein the first planar lightwave circuit and the second planar lightwave circuit having the second refractive index different from the first refractive index are butt jointed on an end surface of the first planar lightwave circuit perpendicular to a lateral surface thereof and an end surface of the second planar lightwave circuit perpendicular to a lateral surface thereof.

6. The optical component recited in claim 2, wherein the first planar lightwave circuit is made of silica-based glass and the second planar lightwave circuit is made of LN.

7. The optical component recited in claim 3, wherein the first planar lightwave circuit is made of silica-based glass and the second planar lightwave circuit is made of LN.

* * * * *